(12) United States Patent
Barbot et al.

(10) Patent No.: US 8,831,309 B2
(45) Date of Patent: Sep. 9, 2014

(54) FILTER APPROACH TO CATHETER ELECTRODE DETECTION AND TRACKING

(75) Inventors: Julien Christian Barbot, Princeton, NJ (US); Atilla Peter Kiraly, Plainsboro, NJ (US)

(73) Assignee: Siemens Aktiengesellschaft, Munich (DE)

( * ) Notice: Subject to any disclaimer, the term of this patent is extended or adjusted under 35 U.S.C. 154(b) by 218 days.

(21) Appl. No.: 13/552,004

(22) Filed: Jul. 18, 2012

(65) Prior Publication Data

US 2013/0034289 A1 Feb. 7, 2013

Related U.S. Application Data

(60) Provisional application No. 61/514,204, filed on Aug. 2, 2011.

(51) Int. Cl.
*G06K 9/00* (2006.01)
*G06K 9/46* (2006.01)

(52) U.S. Cl.
CPC ............................. *G06K 9/4609* (2013.01)
USPC ....................... 382/128; 382/131; 382/132

(58) Field of Classification Search
None
See application file for complete search history.

(56) References Cited

U.S. PATENT DOCUMENTS

| | | | |
|---|---|---|---|
| 7,515,743 B2 | 4/2009 | Kiraly et al. | |
| 7,529,395 B2 * | 5/2009 | Cathier et al. | 382/128 |
| 7,653,258 B2 * | 1/2010 | Wang et al. | 382/266 |
| 7,835,555 B2 * | 11/2010 | Kiraly et al. | 382/128 |
| 7,853,062 B2 * | 12/2010 | Kiraly et al. | 382/131 |
| 2005/0152591 A1 * | 7/2005 | Kiraly et al. | 382/131 |
| 2006/0120591 A1 * | 6/2006 | Cathier et al. | 382/154 |
| 2007/0071298 A1 * | 3/2007 | Kiraly et al. | 382/128 |
| 2007/0121787 A1 * | 5/2007 | Kiraly et al. | 378/128 |
| 2008/0260258 A1 * | 10/2008 | Wang et al. | 382/199 |
| 2012/0098832 A1 * | 4/2012 | Chartouni et al. | 345/426 |

OTHER PUBLICATIONS

Atilla P. Kiraly, et al. "A fast method for colon polyp detection in high-resolution CT data", International Congress Series, vol. 1268, CARS 2004, pp. 983-988.

Brost A, et al., "Respiratory motion compensation by Model-Based Catheter Tracking during EP Procedures", Med Image Analysis 2010 pp. 1-30.

* cited by examiner

*Primary Examiner* — Vu Le
*Assistant Examiner* — Samah Beg (57) ABSTRACT

A method including receiving a first two-dimensional (2D) image; and applying a filter to the 2D image to produce a filtered image that identifies a circular object of interest, wherein the filter is based on the integral sum of the function S, where the filter output at point x is $$M(x) = \int_{\forall y \in V'} S(m, \theta, r, y) \Delta y$$

which is obtained from the 2D image, the function S is represented by $S(m,\theta,r,y)=S_1(m)S_2(\theta,r)$, where m is a magnitude of a gradient at location y, r is a radial distance from y to x, and $\theta$ is an angle between the gradient at location y and the radial distance from y to x, $$S_1(m) = \frac{\left(\tan^{-1}(m - C_1) + \frac{\pi}{2}\right)}{\pi},$$

$$s_2(\theta, r) = \frac{1}{\sigma\sqrt{2\pi}} e^{\frac{-(r \times \sin\theta)^2}{2\sigma^2}} \times \int_{-r \times \sin(90-\theta)}^{C_2 - r \times \sin(90-\theta)} \frac{1}{\sigma\sqrt{2\pi}} e^{\frac{-x^2}{2\sigma^2}} dx,$$

$C_1$ depends on a gray-level value of the object, $C_2$ and $\sigma$ depend on a size of the object.

17 Claims, 5 Drawing Sheets

FILTER APPROACH TO CATHETER ELECTRODE DETECTION AND TRACKING

CROSS-REFERENCE TO RELATED APPLICATION

This application claims priority under 35 U.S.C. §119 to U.S. provisional application No. 61/514,204 filed Aug. 2, 2011, the disclosure of which is incorporated by reference herein in its entirety.

BACKGROUND OF THE INVENTION

1. Technical Field

The present invention relates to detecting circular objects in two-dimensional (2D) medical image data, and more particularly, to catheter electrode detection and tracking.

2. Discussion of the Related Art

Figure 1:
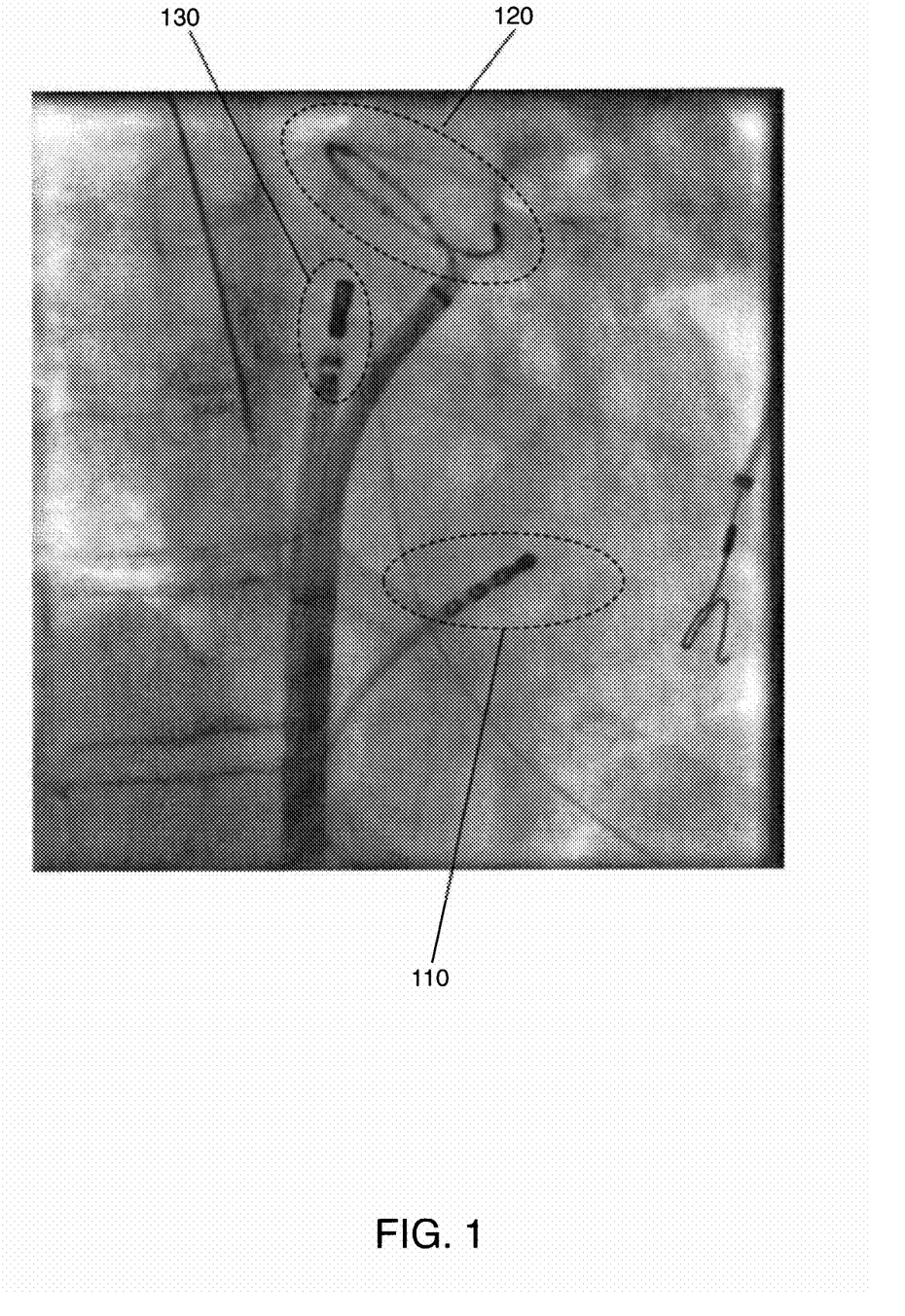
FIG. 1 is an example of an X-ray fluoro showing catheters inserted into a patient.

Electrophysiology (EP) studies and ablation therapies are used to diagnose and treat heart arrhythmia, respectively. They involve the placement of a catheter through a patient's blood vessels to reach the heart. If treatment is necessary, electrodes on a catheter can be used to ablate specific positions. Ablation targets may be found based on electrical signals or based on anatomy. For example, paroxysmal atrial fibrillation is usually treated by pulmonary vein isolation. This involves placing isolation points around the pulmonary veins attached to the left atrium (LA). Bi-plane and mono-plane fluoroscopic X-ray images are used to guide the physician during the procedure. FIG. 1 shows one such image with an ablation catheter 110, a lasso catheter 120 and a coronary sinus catheter 130. In FIG. 1, the dark circular objects near the end of the catheters correspond to electrodes.

Bi-plane fluoroscopy allows for the acquisition of two fluoroscopic images taken at different viewpoints, thereby making it possible to triangulate three-dimensional (3D) points. Additionally, pre-operative 3D images can be used to augment fluoroscopy images and help the physician better locate the ablation region of interest. To further improve augmented fluoroscopy, catheter localization is helpful as it can facilitate motion correction of overlays and tagging of ablation points. Conventional tracking approaches typically require the physical modification of the catheter to include hardware to enable electromagnetic catheter tracking, for example. Although such devices do allow real-time tracking of catheters, they impose limitations on the catheters used and add cost to the procedure. Additionally, external hardware is usually required for tracking.

Computer vision approaches to catheter tracking may be able to offer many of the same benefits as electromagnetic tracking without the need for physical catheter modification at a much cheaper price point. However, such approaches require robust catheter detection in near real-time conditions.

SUMMARY OF THE INVENTION

In an exemplary embodiment of the present invention, there is provided a method, including: receiving a first two-dimensional (2D) image; and applying a filter to the 2D image to produce a filtered image that identifies a circular object of interest, wherein the filter is based on the integral sum of the function S, where the filter output at point x is $$M(x) = \int_{\forall y \in V'} S(m, \theta, r, y) \Delta y$$

which is obtained from the 2D image, the function S is represented by $S(m,\theta,r,y)=S_1(m)S_2(\theta,r)$, where m is a magnitude of a gradient at location y, r is a radial distance from y to x, and $\theta$ is an angle between the gradient at location y and the radial distance from y to x, $$S_1(m) = \frac{\left(\tan^{-1}(m - C_1) + \frac{\pi}{2}\right)}{\pi},$$

$$S_2(\theta, r) = \frac{1}{\sigma\sqrt{2\pi}} e^{\frac{-(r \times \sin\theta)^2}{2\sigma^2}} \times \int_{-r \times \sin(90-\theta)}^{C_2 - r \times \sin(90-\theta)} \frac{1}{\sigma\sqrt{2\pi}} e^{\frac{-x^2}{2\sigma^2}} dx,$$

$C_1$ depends on a gray-level value of the object, $C_2$ and $\sigma$ depend on a size of the object.

The 2D image is a medical image.

The 2D image is a fluoro image.

The circular object includes a catheter electrode.

The method further includes displaying the circular object in 2D.

When a plurality of circular objects are in the filtered image, the method further includes: finding a local maxima of the filter response for each of the circular objects; and identifying the circular objects with a high response as first image candidates.

The method further includes: receiving candidates from a second 2D image to which the filter was directly applied; and identifying corresponding candidates in the first and second 2D images as three-dimensional (3D) candidates.

The method further includes: identifying, from the 3D candidates, those candidates that form a line; and reconstructing a catheter based on the candidates that form a line.

In an exemplary embodiment of the present invention, there is provided a system, including: a memory device for storing a program; a processor in communication with the memory device, the processor operative with the program to: receive a first 2D image; and apply a filter to the 2D image to produce a filtered image that identifies a circular object of interest, wherein the filter is based on the integral sum of the function S, where the filter output at point x is $$M(x) = \int_{\forall y \in V'} S(m, \theta, r, y) \Delta y$$

which is obtained from the 2D image, the function S is represented by $S(m,\theta,r,y)=S_1(m)S_2(\theta,r)$, where m is a magnitude of a gradient at location y, r is a radial distance from y to x, and $\theta$ is an angle between the gradient at location y and the radial distance from y to x, $$S_1(m) = \frac{\left(\tan^{-1}(m - C_1) + \frac{\pi}{2}\right)}{\pi},$$

$$S_2(\theta, r) = \frac{1}{\sigma\sqrt{2\pi}} e^{\frac{-(r \times \sin\theta)^2}{2\sigma^2}} \times \int_{-r \times \sin(90-\theta)}^{C_2 - r \times \sin(90-\theta)} \frac{1}{\sigma\sqrt{2\pi}} e^{\frac{-x^2}{2\sigma^2}} dx,$$

$C_1$ depends on a gray-level value of the object, $C_2$ and $\sigma$ depend on a size of the object.

The 2D image is a medical image.

The 2D image is a fluoro image.

The circular object includes a catheter electrode.

The processor is further operative with the program to display the circular object in 2D.

When a plurality of circular objects are in the filtered image, the processor is further operative with the program to: find a local maxima of the filter response for each of the circular objects; and identify the circular objects with a high response as first image candidates.

The processor is further operative with the program to: receive candidates from a second 2D image to which the filter was directly applied; and identify corresponding candidates in the first and second 2D images as 3D candidates.

The processor is further operative with the program to: identify, from the 3D candidates, those candidates that form a line; and reconstruct a catheter based on the candidates that form a line.

In an exemplary embodiment of the present invention, there is provided a computer program product, including: a non-transitory computer readable storage medium having computer readable program code embodied therewith, the computer readable program code comprising: computer readable program code configured to perform the steps of: receiving a first 2D image; and applying a filter to the 2D image to produce a filtered image that identifies a circular object of interest, wherein the filter is based on the integral sum of the function S, where the filter output at point x is $$M(x) = \int_{\forall y \in V'} S(m, \theta, r, y) \Delta y$$

which is obtained from the 2D image, the function S is represented by $S(m,\theta,r,y)=S_1(m)S_2(\theta,r)$, where in is a magnitude of a gradient at location y, r is a radial distance from y to x, and $\theta$ is an angle between the gradient at location y and the radial distance from y to x, $$S_1(m) = \frac{\left(\tan^{-1}(m - C_1) + \frac{\pi}{2}\right)}{\pi},$$

$$S_2(\theta, r) = \frac{1}{\sigma\sqrt{2\pi}} e^{\frac{-(r \times \sin\theta)^2}{2\sigma^2}} \times \int_{-r \times \sin(90-\theta)}^{C_2 - r \times \sin(90-\theta)} \frac{1}{\sigma\sqrt{2\pi}} e^{\frac{-x^2}{2\sigma^2}} dx,$$

$C_1$ depends on a gray-level value of the object, $C_2$ and $\sigma$ depend on a size of the object.

DETAILED DESCRIPTION OF EXEMPLARY EMBODIMENTS

Described herein is a filter-based method to highlight or detect electrodes within fluoro images in real-time, according to an exemplary embodiment of the present invention. The method can be used to provide a three-dimensional (3D) reconstruction of portions of a catheter or to highlight catheter-like objects (e.g., candidates) within the images. Further refinements of the catheter candidates can allow for the detection of the catheter and complete catheter reconstructions. Due to its speed, the invention can be used as a starting point for existing catheter detection and reconstruction methods.

The invention employs a candidate generation filter used for polyp detection in computed tomography (CT) datasets known as the magnitude, angle, radius and size (MARS) filter. A detailed description of the MARS filter can be found in Kiraly A P, Laks S, Macari M, Geiger B, Bogoni L, Novak C L, "A fast method for colon polyp detection in high-resolution CT data," International Congress Series, Volume 1268, CARS 2004, Pages 983-988 and U.S. Pat. No. 7,515,743, the disclosures of which are incorporated by reference herein in their entireties. Given a 3D location x, with the volume V to be processed, the MARS filter computes a value that highlights spherical objects.

The general equation for the MARS filter is as follows:

$$M(x) = \frac{\int_{\forall y \in V'} S(m, \theta, r, y) \Delta y}{T(V')}$$

where M(x) refers to the output of the MARS filter at location x. y is another location in the volume. m is the magnitude of the gradient at location y, r is the radial distance from y to x, and θ is the angle between the gradient at location y and the ray from x to y. The integral proceeds over a defined subset volume V' of the original volume V. The main function S defines how the values will be weighted at each individual point and summed within the integral. The function T provides a weighting based on the size of the given volume. Hence, the definition of S determines specific properties of the filter.

In the following, we give a semi-separable definition for S and, according to an exemplary embodiment of the present invention, apply it only to two-dimensional (2D) images.

$S(m, \theta, r, y) = S_1(m) S_2(\theta, r)$, (note that $\theta$ and $r$ depend on $y$)

where $$S_1(m) = \frac{\left(\tan^{-1}(m - C_1) + \frac{\pi}{2}\right)}{\pi}$$

$$S_2(\theta, r) = \frac{1}{\sigma\sqrt{2\pi}} e^{\frac{-(r \times \sin\theta)^2}{2\sigma^2}} \times \int_{-r \times \sin(90-\theta)}^{C_2 - r \times \sin(90-\theta)} \frac{1}{\sigma\sqrt{2\pi}} e^{\frac{-x^2}{2\sigma^2}} dx.$$

$C_1, C_2$, and σ are constants that depend upon the properties of the imaging device and the objects of interest. For example, $C_1$ can be determined by the gray-level value of the objects of interest (e.g., catheters). The values for $C_2$ and σ are size related and depend on the size of the objects of interest.

This particular definition for S provides an excellent filter to highlight catheter electrodes in fluoro images. In this definition, the value of the function T from the 3D formula is constant and set to 1. The function $S_1$ provides a scaling based on the magnitude of the given argument. This is used for both magnitude-based scaling and as a component in other function definitions. $S_2$ provides a score based on the distance and direction of the gradient at a specific point. Note that this does not depend on the values obtained by nearby points and hence the computations can proceed in any order around the point x, thus allowing the potential for efficient implementation.

Simplifying this function to 2D allows for the rapid application of the filter. Further speed optimizations are possible by multi-threading or graphics processing unit (GPU) acceleration.

Figure 2:
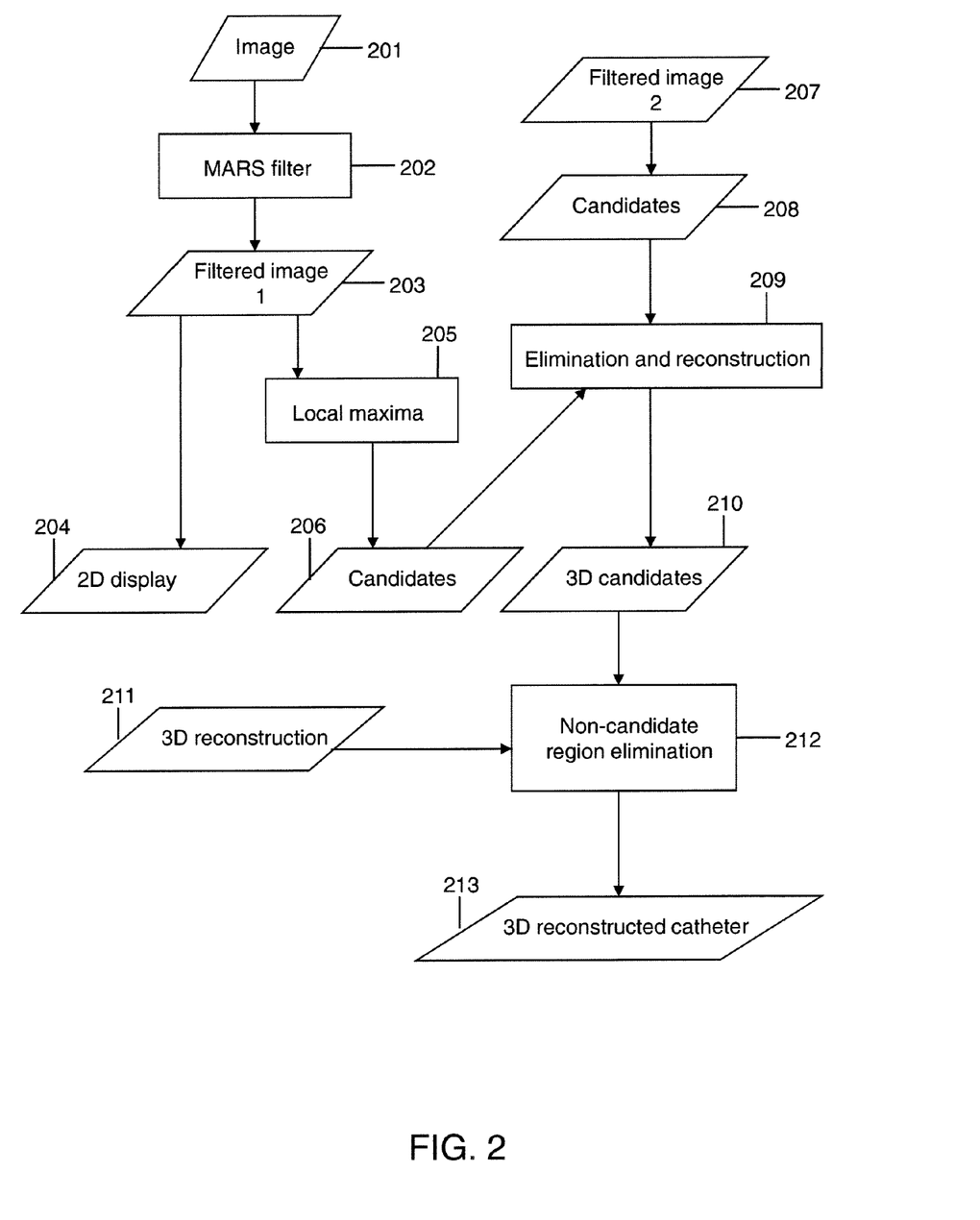
FIG. 2 is a flowchart of a method according to an exemplary embodiment of the present invention.

FIG. 2 describes the possible uses of the filter of the present invention. The filter being the MARS filter using the semi-separable definition for S, where parameters $C_1$, $C_2$, and $\theta$ are tuned for the objects of interest.

Briefly, given a 2D fluoro image, the filter is applied to emphasize electrode-like features in the image. Next, candidates are selected from the filtered image and then are processed to determine final candidates. In FIG. 2, local maxima of the filter response are used to determine candidates, but other methods that identify bright points of response can be employed as well. The final candidates are the determined electrodes of the catheter, thereby allowing for catheter electrode detection and tracking. The final candidate selection may be determined by machine learning methods or the approach discussed in reference to FIG. 3.

FIG. 2, which is a flowchart of four possible configurations of the method according to exemplary embodiment of the present invention, will now be described in more detail. Central to all of the configurations is the creation of the filtered image (203). The filtered image is created by applying the modified MARS filter (202) to a 2D image (201). The 2D image may be a medical image, e.g., a mono-plane fluoro image or a bi-plane fluoro image.

Figure 3:
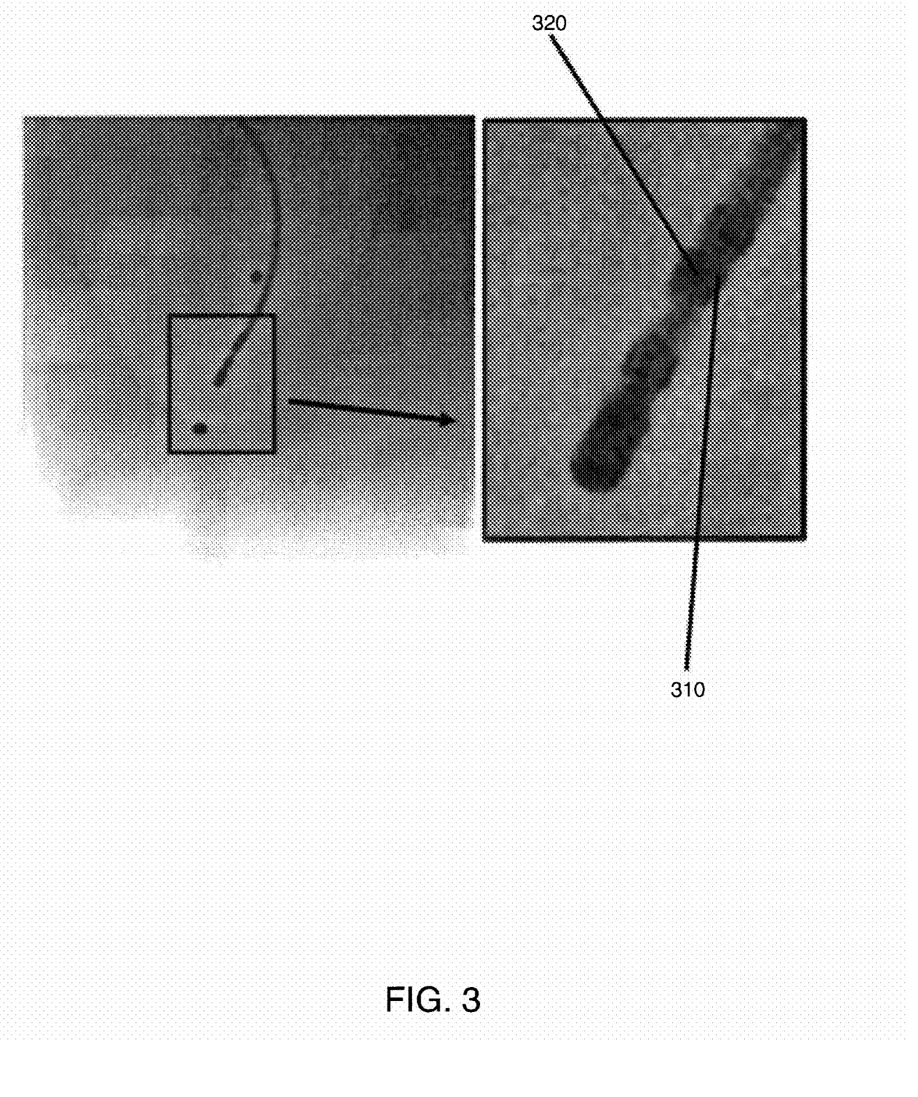
FIG. 3 is an image filtered according to an exemplary embodiment of the present invention.

Once the filtered image is computed, the first possibility is to display it directly to highlight electrode-like (e.g., circular) objects as shown by 310 in FIG. 3 (204). The next possibility is to run a classifier to select specific candidates with a high response (206). In this case, the result of selecting the local maximum of the filter response (205) produces the candidates. 320 in FIG. 3 show an example of these candidates. In FIG. 3, a simple clustering of closely grouped candidates results in only electrodes of the catheter. Other methods such as including only points that satisfy a certain error for a least-squares fit of a line or the use of machine learning methods such as a support vector machine (SVM) are also possible.

More specifically, FIG. 3 shows the initial results of the filter with the higher local maximum candidates identified by 320. The time required to obtain these candidates was 100 ms per frame. This time can be reduced by further optimizations. It is estimated that around 50 ms per frame or less would be achievable. Even more would be possible with multi-threaded implementations. The results require a tuning of the parameters $C_1$, $C_2$, and $\sigma$. This tuning may also be done automatically by a user clicking on or near portions of the electrode as well as knowing the approximate electrode size.

Further reduction of candidates is possible by using information from candidates (208) from another filtered image (207) obtained by bi-plane imaging. Given the known alignment of the two planes (i.e., of the images 203 and 207), a series of 3D candidates can be formed by finding matching candidate pairs in the images (210). This can also be used to eliminate candidates that do not have a matching pair (209). For example, if a candidate in one image does not have a matching pair in the other image it is discarded.

Figure 4:
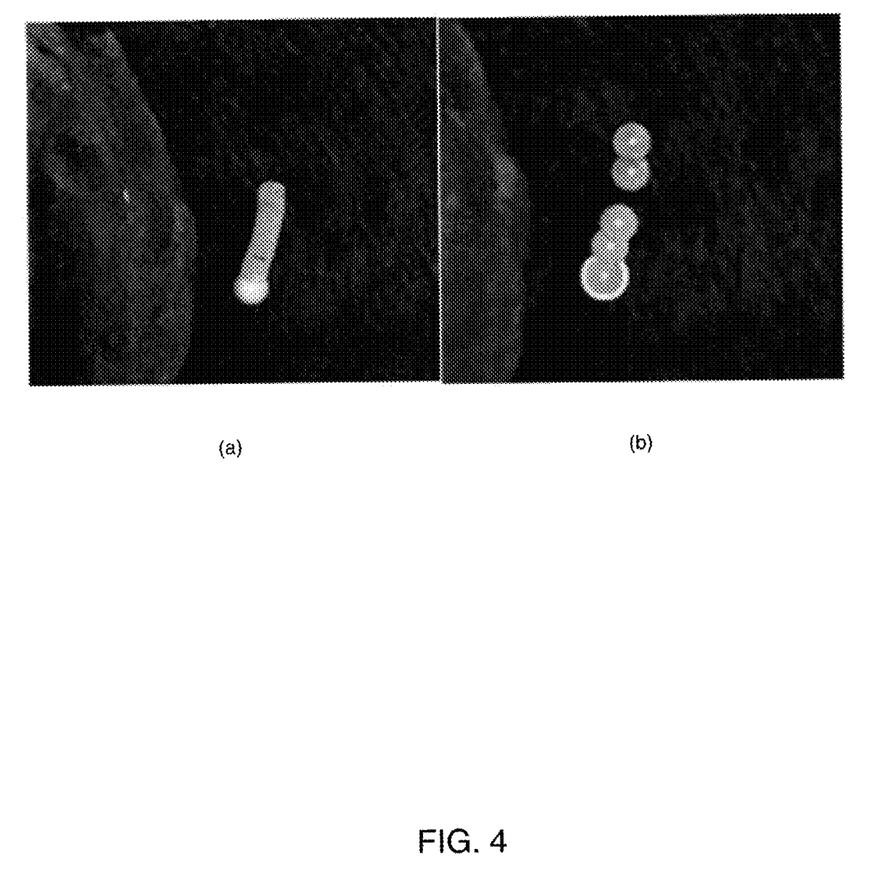
FIG. 4 show three-dimensional (3D) candidates used to reconstruct a catheter according to an exemplary embodiment of the present invention.

Finally, reconstruction methods that assume sparse radio-opaque objects in the bi-plane views often can result in ghosting due to the lack of knowledge of the corresponding objects. In 3D reconstruction (211), by allowing the candidates (210) to be used to find the most likely candidate pair, ghosting artifacts can be eliminated (212) and a true catheter reconstruction is possible (213). The filtered image 203 can also be used directly as input for reconstruction methods to better highlight corresponding regions during reconstruction. As pertains to reconstruction, images (a) and (b) of FIG. 4 show 3D candidates rendered using two different methods for visualization. Image (a) shows a tube fit through the candidate points while image (b) shows each points rendered as a sphere. As can be seen, those candidates that form a line are used to reconstruct a catheter.

As will be appreciated by one skilled in the art, aspects of the present invention may be embodied as a system, method or computer program product. Accordingly, aspects of the present invention may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, aspects of the present invention may take the form of a computer program product embodied in one or more computer readable medium(s) having computer readable program code embodied thereon.

Any combination of one or more computer readable medium(s) may be utilized. The computer readable medium may be a computer readable signal medium or a computer readable storage medium. A computer readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer readable storage medium may be any tangible medium that can contain, or store a program for use by or in connection with an instruction execution system, apparatus, or device.

A computer readable signal medium may include a propagated data signal with computer readable program code embodied therein, for example, in baseband or as part of a carrier wave. Such a propagated signal may take any of a variety of forms, including, but not limited to, electro-magnetic, optical, or any suitable combination thereof. A computer readable signal medium may be any computer readable medium that is not a computer readable storage medium and that can communicate, propagate, or transport a program for use by or in connection with an instruction execution system, apparatus, or device.

Program code embodied on a computer readable medium may be transmitted using any appropriate medium, including but not limited to wireless, wireline, optical fiber cable. radio frequency (RF), etc., or any suitable combination of the foregoing.

Computer program code for carrying out operations for aspects of the present invention may be written in any combination of one or more programming languages. including an object oriented programming language such as Java, Smalltalk, C++ or the like and conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Aspects of the present invention are described with reference to flowchart illustrations and/or block diagrams of methods, apparatus (systems) and computer program products according to embodiments of the invention. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer readable medium that can direct a computer, other programmable data processing apparatus, or other devices to function in a particular manner, such that the instructions stored in the computer readable medium produce an article or manufacture including instructions which implement the function/act specified in the flowchart and/or block diagram block or blocks.

The computer program instructions may also be loaded onto a computer, other programmable data processing apparatus, or other devices to cause a series of operational steps to be performed on the computer, other programmable apparatus or other devices to produce a computer implemented process such that the instructions which execute on the computer or other programmable apparatus provide processes for implementing the functions/acts specified in the flowchart and/or block diagram block or blocks.

Figure 5:
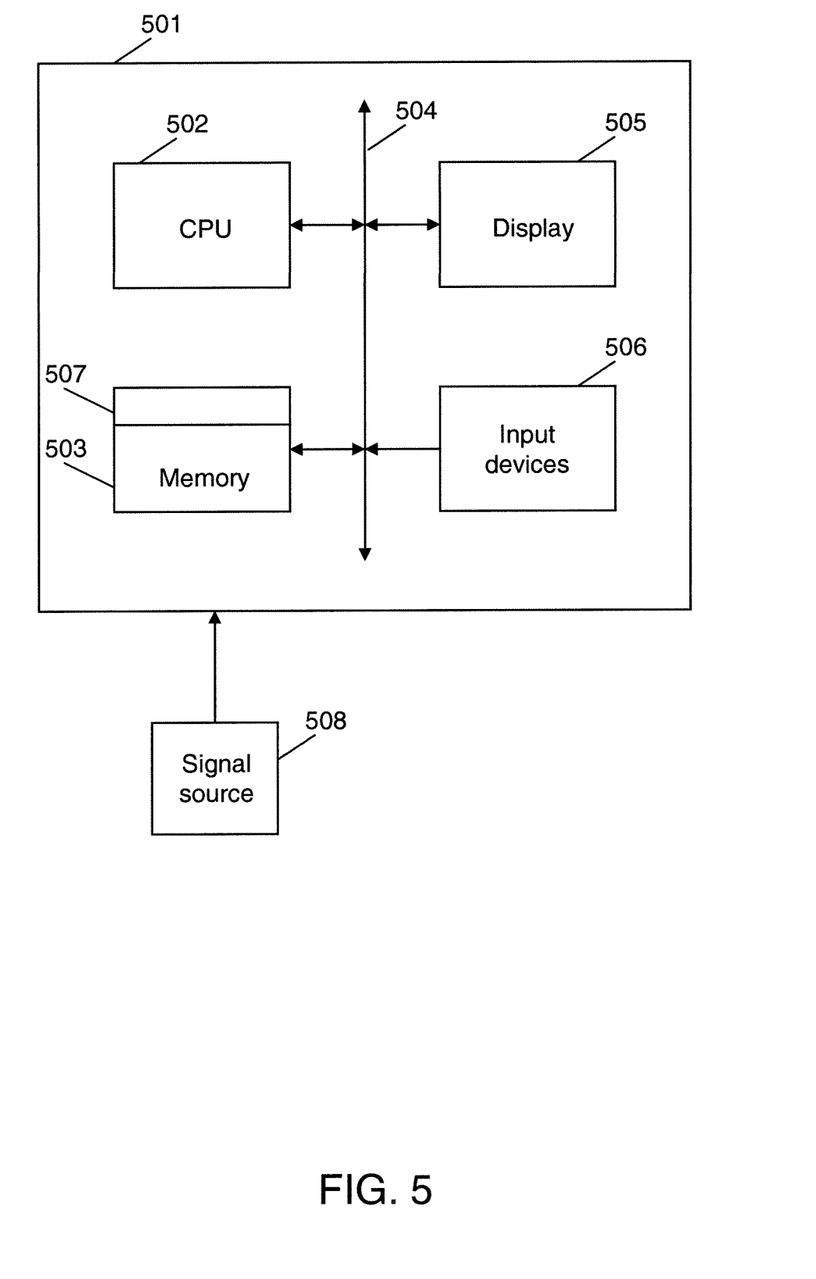
FIG. 5 illustrates a computer system in which an exemplary embodiment of the present invention may be implemented.

Referring now to FIG. 5, according to an exemplary embodiment of the present invention, a computer system 501 can comprise, inter alia, a central processing unit (CPU) 502, a memory 503 and an input/output (I/O) interface 504. The computer system 501 is generally coupled through the I/O interface 504 to a display 505 and various input devices 506 such as a mouse and keyboard. The support circuits can include circuits such as cache, power supplies, clock circuits, and a communications bus. The memory 503 can include RAM, ROM, disk drive, tape drive, etc., or a combination thereof. Exemplary embodiments of present invention may be implemented as a routine 507 stored in memory 503 (e.g., a non-transitory computer-readable storage medium) and executed by the CPU 502 to process the signal from a signal source 508. As such, the computer system 501 is a general-purpose computer system that becomes a specific purpose computer system when executing the routine 507 of the present invention.

The computer system 501 also includes an operating system and micro-instruction code. The various processes and functions described herein may either be part of the micro-instruction code or part of the application program (or a combination thereof) which is executed via the operating system. In addition, various other peripheral devices may be connected to the computer system 501 such as an additional data storage device and a printing device.

The flowchart and block diagrams in the figures illustrate the architecture, functionality, and operation of possible implementations of systems, methods and computer program products according to various embodiments of the present invention. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

The terminology used herein is for the purpose of describing particular embodiments only and is not intended to be limiting of the invention. As used herein, the singular forms "a," "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

The corresponding structures, materials, acts, and equivalents of all means or step plus function elements in the claims below are intended to include any structure, material, or act for performing the function in combination with other claimed elements as specifically claimed. The description of the present invention has been presented for purposes of illustration and description, but is not intended to be exhaustive or limited to the invention in the form disclosed. Many modifications and variations will be apparent to those of ordinary skill in the art without departing from the scope and spirit of the invention. The embodiment was chosen and described to best explain the principles of the invention and the practical application, and to enable others of ordinary skill in the art to understand the invention for various embodiments with various modifications as are suited to the particular use contemplated.

What is claimed is:

1. A method, comprising:
receiving a first two-dimensional (2D) image; and
applying a filter to the 2D image to produce a filtered image that identifies a circular object of interest,
wherein the filter is based on an integral sum of a function S, where the filter output at point x is $$M(x) = \int_{\forall y \in V'} S(m, \theta, r, y) \Delta y$$

which is obtained from the 2D image, the function S is represented by $S(m,\theta,r,y)=S_1(m)S_2(\theta,r)$,
where m is a magnitude of a gradient at location y, r is a radial distance from y to x, and $\theta$ is an angle between the gradient at location y and the radial distance from y to x, $$S_1(m) = \frac{\left(\tan^{-1}(m-C_1) + \frac{\pi}{2}\right)}{\pi},$$

$$S_2(\theta, r) = \frac{1}{\sigma\sqrt{2\pi}} e^{\frac{-(r\times\sin\theta)^2}{2\sigma^2}} \times \int_{-r\times\sin(90-\theta)}^{C_2-r\times\sin(90-\theta)} \frac{1}{\sigma\sqrt{2\pi}} e^{\frac{-x^2}{2\sigma^2}} dx,$$

$C_1$ depends on a gray-level value of the object, $C_2$ and $\sigma$ depend on a size of the object.

2. The method of claim 1, wherein the 2D image is a medical image.

3. The method of claim 2, wherein the 2D image is a fluoro image.

4. The method of claim 1, wherein the circular object includes a catheter electrode.

5. The method of claim 1, further comprising displaying the circular object in 2D.

6. The method of claim 1, wherein when a plurality of circular objects are in the filtered image, the method further comprises:
   finding a local maxima of the filter response for each of the circular objects; and
   identifying the circular objects with a high response as first image candidates.

7. The method of claim 6, further comprising:
   receiving candidates from a second 2D image to which the filter was directly applied; and
   identifying corresponding candidates in the first and second 2D images as three-dimensional (3D) candidates.

8. The method of claim 7, further comprising:
   identifying, from the 3D candidates, those candidates that form a line; and
   reconstructing a catheter based on the candidates that form a line.

9. A system, comprising:
   a memory device for storing a program;
   a processor in communication with the memory device, the processor operative with the program to:
   receive a first two-dimensional (2D) image; and
   apply a filter to the 2D image to produce a filtered image that identifies a circular object of interest,
   wherein the filter is based on an integral sum of a function S, where the filter output at point x is $$M(x) = \int_{\forall y \in V'} S(m, \theta, r, y) \Delta y$$

which is obtained from the 2D image, the function S is represented by $S(m,\theta,r,y) = S_1(m)S_2(\theta,r)$,
where m is a magnitude of a gradient at location y, r is a radial distance from y to x, and $\theta$ is an angle between the gradient at location y and the radial distance from y to x, $$S_1(m) = \frac{\left(\tan^{-1}(m-C_1) + \frac{\pi}{2}\right)}{\pi},$$

$$S_2(\theta, r) = \frac{1}{\sigma\sqrt{2\pi}} e^{\frac{-(r\times\sin\theta)^2}{2\sigma^2}} \times \int_{-r\times\sin(90-\theta)}^{C_2-r\times\sin(90-\theta)} \frac{1}{\sigma\sqrt{2\pi}} e^{\frac{-x^2}{2\sigma^2}} dx,$$

$C_1$ depends on a gray-level value of the object, $C_2$ and $\sigma$ depend on a size of the object.

10. The system of claim 9, wherein the 2D image is a medical image.

11. The system of claim 10, wherein the 2D image is a fluoro image.

12. The system of claim 9, wherein the circular object includes a catheter electrode.

13. The system of claim 9, wherein the processor is further operative with the program to display the circular object in 2D.

14. The system of claim 9, wherein when a plurality of circular objects are in the filtered image, the processor is further operative with the program to:
   find a local maxima of the filter response for each of the circular objects; and
   identify the circular objects with a high response as first image candidates.

15. The system of claim 14, wherein the processor is further operative with the program to:
   receive candidates from a second 2D image to which the filter was directly applied; and
   identify corresponding candidates in the first and second 2D images as three-dimensional (3D) candidates.

16. The system of claim 15, wherein the processor is further operative with the program to:
   identify, from the 3D candidates, those candidates that form a line; and
   reconstruct a catheter based on the candidates that form a line.

17. A non-transitory computer readable storage medium having computer readable program code embodied therewith, the computer readable program code comprising:
   computer readable program code configured to perform the steps of:
   receiving a first two-dimensional (2D) image; and
   applying a filter to the 2D image to produce a filtered image that identifies a circular object of interest,
   wherein the filter is based on an integral sum of a function S, where the filter output at point x is $$M(x) = \int_{\forall y \in V'} S(m, \theta, r, y) \Delta y$$

which is obtained from the 2D image, the function S is represented by $S(m,\theta,r,y) = S_1(m)S_2(\theta,r)$,
where m is a magnitude of a gradient at location y, r is a radial distance from y to x, and $\theta$ is an angle between the gradient at location y and the radial distance from y to x, $$S_1(m) = \frac{\left(\tan^{-1}(m-C_1) + \frac{\pi}{2}\right)}{\pi},$$

$$S_2(\theta, r) = \frac{1}{\sigma\sqrt{2\pi}} e^{\frac{-(r\times\sin\theta)^2}{2\sigma^2}} \times \int_{-r\times\sin(90-\theta)}^{C_2-r\times\sin(90-\theta)} \frac{1}{\sigma\sqrt{2\pi}} e^{\frac{-x^2}{2\sigma^2}} dx,$$

$C_1$ depends on a gray-level value of the object, $C_2$ and $\sigma$ depend on a size of the object.

* * * * *